United States Patent [19]

Gorzegno

[11] Patent Number: 4,951,612
[45] Date of Patent: Aug. 28, 1990

[54] CIRCULATING FLUIDIZED BED REACTOR UTILIZING INTEGRAL CURVED ARM SEPARATORS

[75] Inventor: Walter P. Gorzegno, Morristown, N.J.

[73] Assignee: Foster Wheeler Energy Corporation, Clinton, N.J.

[21] Appl. No.: 356,485

[22] Filed: May 25, 1989

[51] Int. Cl.⁵ .......................... F22B 1/00; F23G 5/00
[52] U.S. Cl. .................................. 122/4 D; 110/245; 110/216
[58] Field of Search ................ 110/245, 216; 122/4 D

[56] References Cited

U.S. PATENT DOCUMENTS

| | | |
|---|---|---|
| 2,437,294 | 3/1948 | Dalin . |
| 2,937,141 | 5/1960 | Helwig . |
| 3,327,456 | 6/1967 | Guber, Jr. et al. . |
| 3,470,678 | 10/1969 | Clark et al. . |
| 3,732,920 | 5/1973 | Kimmel . |
| 4,295,343 | 10/1981 | Izumi . |
| 4,483,696 | 11/1984 | Zipay et al. . |
| 4,699,068 | 10/1987 | Engstrom ............................ 110/216 |
| 4,713,098 | 12/1987 | Idvorian et al. . |
| 4,746,337 | 5/1988 | Magol et al. . |
| 4,880,450 | 11/1989 | Magol et al. . |
| 4,904,286 | 2/1990 | Magol et al. . |
| 4,913,711 | 4/1990 | Stewart . |
| 4,920,924 | 5/1990 | Abdulally et al. ................. 122/4 D |

FOREIGN PATENT DOCUMENTS 581426 10/1946 United Kingdom .
587240 4/1947 United Kingdom .

Primary Examiner—Henry C. Yuen
Attorney, Agent, or Firm—Marvin A. Naigur

[57] ABSTRACT

A reactor having a furnace and a heat recovery section. The upper portion of said furnace extends coaxially in a spaced relationship within a shell. A bed of solid particulate material including fuel is supported in the furnace and air is introduced into the bed at a velocity sufficient to fluidize same and support the combustion or gasification of the fuel. A mixture of air, the gaseous products of combustion, and the particulate material entrained by the air and the gaseous products of combustion are discharged through a plurality of slots and arcuate arms disposed at the upper portion of the furnace onto the inner wall of the coaxial shell, effecting a separation of the particulate material from the mixture. The remaining mixture of air and the gaseous products of combustion rise upwardly and are directed to the heat recovery section. The separated particulate material is directed from the coaxial shell to a plurality of recycle conduits.

13 Claims, 2 Drawing Sheets

CIRCULATING FLUIDIZED BED REACTOR UTILIZING INTEGRAL CURVED ARM SEPARATORS

BACKGROUND OF THE INVENTION

This invention relates to a fluidized bed reactor, and, more particularly, to such a reactor in which heat is generated by the combustion of fuel in a fluidized bed.

Fluidized bed reactors, combustors, or gasifiers, are well known. In these arrangements, air is passed through a bed of particulate material, including a fossil fuel such as coal and an adsorbent for the sulfur generated as a result of combustion of the coal, to fluidize the bed and to promote the combustion of the fuel at a relatively low temperature. When the heat produced by the fluidized bed is utilized to convert water to steam, such as in a steam generator, the fluidized bed system offers an attractive combination of high heat release, high sulfur adsorption, low nitrogen oxides emissions and fuel flexibility.

The most typical fluidized bed combustion system is commonly referred to as a bubbling fluidized bed in which a bed of particulate materials is supported by an air distribution plate, to which combustion-supporting air is introduced through a plurality of perforations in the plate, causing the material to expand and take on a suspended, or fluidized, state. In the event the reactor is in the form of a steam generator, the walls of the reactor are formed by a plurality of heat transfer tubes. The heat produced by combustion within the fluidized bed is transferred to a heat exchange medium, such as water, circulating through the tubes. The heat transfer tubes are usually connected to a natural water circulation circuitry, including a steam drum, for separating water from the steam thus formed which is routed to a turbine to generate electricity or to a steam user.

In an effort to extend the improvements in combustion efficiency, pollutant emissions control, and operation turn-down afforded by the bubbling bed, a fluidized bed reactor has been developed utilizing a fast, or circulating, fluidized bed. According to this technique, fluidized bed densities ranging to 20% volume of solids are attained which is well below the 30% volume of solids typical of the bubbling fluidized bed. The formation of the low density circulating fluidized bed results from smaller particle sizes and higher fluidizing velocities. For a material balance a higher solids recycle is required. The velocity range of a circulating fluidized bed is between the solids terminal, or free fall, velocity and a velocity which is a function of the throughput, beyond which the bed would be converted into a pneumatic transport line.

The high solids circulation required by the circulating fluidized bed makes it insensitive to fuel heat release patterns, thus minimizing the variation of the temperature within the combustor or gasifier, and therefore decreasing the nitrogen oxides formation. Also, the high solids loading improves the efficiency of the mechanical device used to separate the gas from the solids for solids recycle. The resulting increase in sulfur adsorbent and fuel residence times reduces the required adsorbent addition. Furthermore, the circulating fluidized bed inherently has more turndown than the bubbling fluidized bed.

The circulating fluidized bed reactor, however, requires relatively large cyclone separators, which negates the possibility of a compact design which can be modularizied and easily transported and erected. This is a major disadvantage especially when the fluidized bed is utilized as a steam generator. Also, the particulate fuel and adsorbent material used in a circulating fluidized bed process must be relatively smaller in size therefore requiring further crushing and drying of the feedstock material, which is expensive. Further, in a circulating fluidized bed system, the bed height required for adequate adsorption of the sulfur is greater than that in a conventional bubbling fluidized bed system, which further adds to the capital expense and operating costs.

SUMMARY OF THE INVENTION

It is therefore an object of the present invention to provide a fluidized bed reactor which is relatively compact in size, can be modularized and is relatively easy to erect.

It is a further object of the present invention to provide a reactor of the above type in which a wide range of fuel and adsorption particle size can be utilized.

It is a still further object of the present invention to provide a reactor of the above type in which adequate adsorption is achieved with a reduced bed height.

It is a still further object of the present invention to provide a reactor of the above type in which a gas column is formed in the fluidized bed boiler which is saturated with particulate material.

It is a still further object of the present invention to provide a reactor of the above type in which the particulate material in the gas column is collected and essentially the same amount returned to the fluidized bed to maintain the saturated gas column.

It is a still further object of the present invention to provide a reactor of the above type in which the volume of solids contained in the boiler furnace is relatively low, compared to that of a bubbling fluidized bed.

It is a still further object of the present invention to provide a reactor of the above type in which the temperature of the fluidized bed is varied by varying the amount of air introduced into the bed.

It is a still further object of the present invention to provide a reactor of the above type in which cooling surfaces are provided in contact with the bed and the gas column.

It is a still further object of the present invention to provide a reactor of the above type which incorporates operating principles and advantages of both the bubbling fluidized bed and the fast fluidized bed.

It is a still further object of the present invention to provide a reactor of the above type in which the conventional cyclone separator is replaced by a curved arm separating system, integral with the furnace.

It is a still further object of the present invention to provide a reactor of the above type which is utilized to generate steam.

Toward the fulfillment of these and other objects, the fluidized bed reactor of the present invention includes a furnace and a heat recovery section. The upper portion of said furnace extends coaxially in a spaced relationship within a shell. A bed of solid particulate material including fuel is supported in the furnace and air is introduced into the bed at a velocity sufficient to fluidize same and support the combustion or gasification of said fuel. A mixture of air, the gaseous products of said combustion, and the particulate material entrained by the air and the gaseous products of said combustion is discharged through a plurality of arcuate arms disposed at the upper portion of said furnace onto the inner wall of the coaxial shell effecting a separation of the particulate material from said mixture. The remaining gaseous products of said combustion with some fine particulate material rise upwardly and are directed to the heat recovery section. The separated particulate material is directed from the coaxial shell to a plurality of recycle conduits connected to the lower portion of the furnace for returning the separated particulate material to the bed.

BRIEF DESCRIPTION OF THE DRAWINGS

The above brief description as well as further objects, features and advantages of the reactor of the present invention will be more fully appreciated by reference to the following detailed description of presently preferred but nonetheless illustrative embodiments in accordance with the present invention when taken in conjunction with the accompanying drawings in which.

DESCRIPTION OF THE PREFERRED EMBODIMENT

Figure 1:
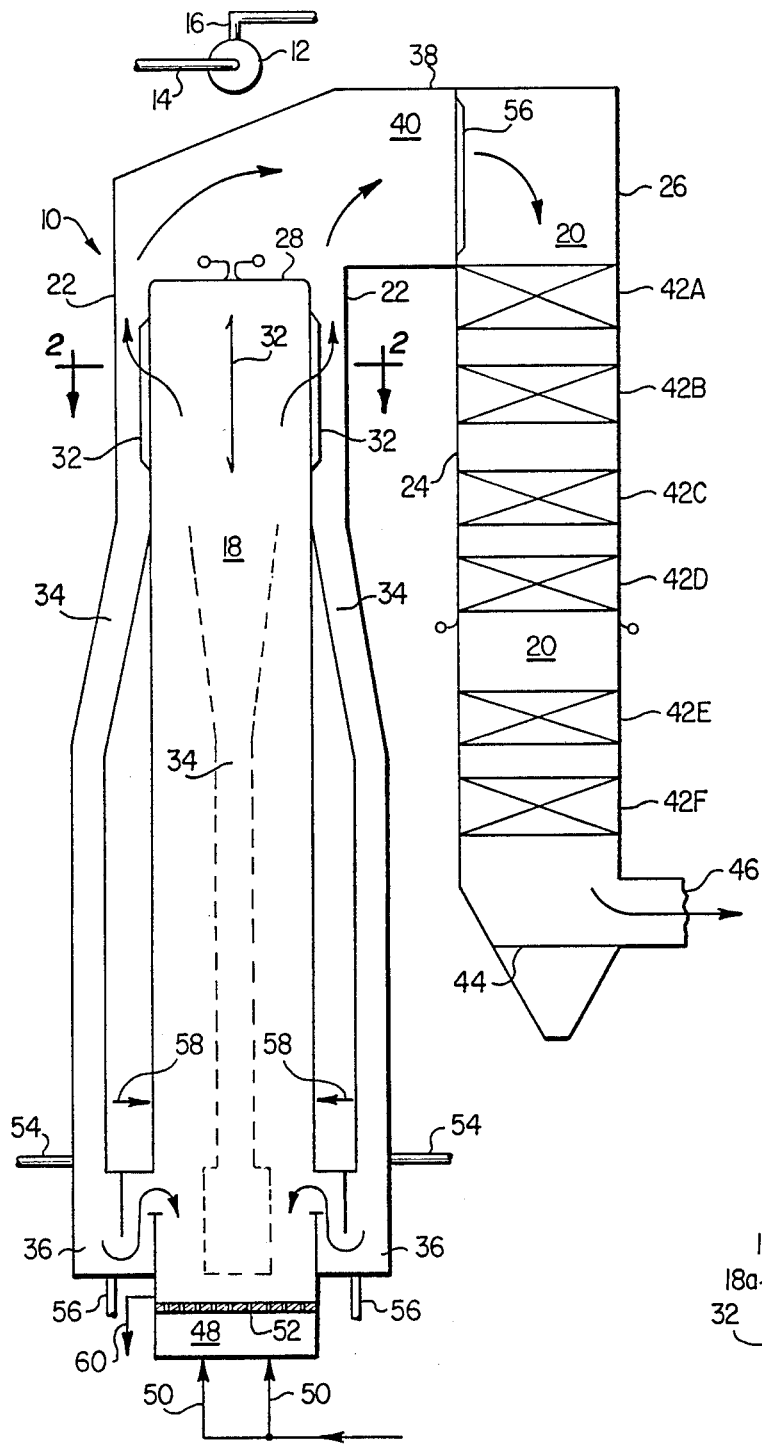
FIG. 1 is a schematic view depicting the fluidized bed reactor of the present invention.

The fluidized bed reactor of the present invention is shown by the reference numeral 10 in FIG. 1 of the drawings, and forms a portion of a steam generator including a steam drum 12 which receives water from a feed pipe 14 and discharges the steam generated, via a plurality of steam pipes 16.

Figure 2:
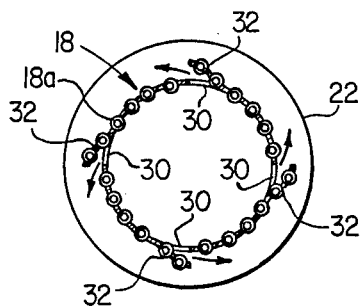
FIG. 2 is a cross-sectional view taken along line 2—2 of FIG. 1.

The reactor 10 is disposed below the steam drum 12 and includes a water wall furnace 18 and a steam cooled heat recovery section 20. The furnace 18 has a circular cross-section and its wall is formed by a plurality of spaced, parallel vertically disposed water tubes 18a interconnected by continuous fins extending from diametrically opposite portions thereof to form a contiguous, air-tight structure, as shown in FIG. 2. The upper portion of the furnace, extends within a conduit shell 22 in a coaxially spaced relationship. The heat recovery section 20 is defined by a front wall 24 and a spaced, parallel rear wall 26. It is understood that two spaced contiguous sidewalls (not shown) extend perpendicular to the front and rear walls to form a substantially rectangular vessel.

A roof 28 extends over the upper end portion of the furnace 18 and is a continuation of the furnace water walls. As shown in FIG. 2, a plurality of slots 30 are formed through the upper wall portion of the furnace 18. A plurality of arcuate arms 32 are connected to and extend outwardly from the furnace 18 in registry with the slots 30, respectively, with the free ends of the arms 32 being open to permit a mixture of entrained particles and gases, described below, to discharge from the slots in a substantially tangential direction relative to the inner wall of the shell 22. In a preferred embodiment, the arcuate arms 32 and openings 30 are formed by bending the wall of furnace 18 outward toward the inner wall of shell 22. It is understood that a support structure (not shown) can be provided within the shell 22 for supporting the upper end portion of furnace 18 within the shell 22 in the coaxial position shown.

In a preferred embodiment, four recycle conduits 34 are symmetrically located around the perimeter of the lower portion of the shell 22 and communicate with the lower end of the annular space between the shell and the wall of the furnace 18. Each recycle conduit 34 extends from the lower portion of the shell 22 to the lower wall portion of the furnace 18. In a preferred embodiment, the upper portion of each recycle conduit 34 is angled inwardly to reduce particle build-up in the lowermost extremity of the shell 22. Each recycle conduit 34 communicates with the lower portion of the furnace 18 through a valve 36, preferably in the form of a "J-valve," which prevents back flow from the furnace 18 to the recycle conduits 34 in a conventional manner.

A roof 38 extends over the upper portions of the furnace 18, the shell 22 and the upper ends of the walls 24 and 26 and the contiguous side walls and it, along with the walls 24 and 26, and the contiguous side walls are also formed by a plurality of spaced, parallel vertically-disposed water tubes interconnected by continuous fins, to form a contiguous, air-tight structure. Since this type of structure is conventional, it is not shown in the drawings nor will it be described in any further detail.

The roof 38, an extended upper portion of the shell 22, and the wall 24 form a flue-gas plenum 40 which communicates with the upper portion of the shell 22 and with the heat recovery section 20 through openings 24a in the wall 24.

A plurality of tube banks 42A, 42B, 42C, 42D, 42E and 42F are disposed in the heat recovery section 20. Each tube bank consists of a plurality of tubes connected in a flow circuitry for passing steam or water through the tubes to remove heat from the gases. In a preferred embodiment, tube banks 42A and 42B comprise a finishing superheater, tube banks 42C and 42D comprise a primary superheater, and tube banks 42E and 42F comprise economizer circuits. Since the tube banks and their associated circuitry are conventional, they will not be described in any further detail.

A hopper 44 is disposed in the lower portion of the heat recovery section 20 for collecting particulate material. A flue gas outlet 46 routes flue gases downstream to other equipment not shown in this embodiment.

Although not shown in the drawings, it is understood that fluid flow circuitry, including the feed pipe 14, is provided for forming a flow circuit for the water and steam through the steam drum 12, the walls of the furnace 18, the heat recovery section 20, and the shell 22, as well as the plenum 40 and the tube banks 42A-42F. Since this is a conventional technique it will not be described any further.

A plenum chamber 48 is disposed at the lower portion of the furnace 18 into which pressurized air from a suitable source 50 is introduced by conventional means, such as a forced-draft blower, or the like.

A perforated air distribution plate 52 is suitably supported at the lower portion of the furnace 18 and above the plenum chamber 48. The air introduced through the plenum chamber 48 passes in an upwardly direction through the air distribution plate 52 and may be preheated by air preheaters (not shown) and appropriately regulated by air control dampers as needed. The air distribution plate 52 is adapted to support a bed of a particulate material consisting, in general, of crushed coal and limestone, or dolomite, for absorbing the sulfur formed during the combustion of the coal.

A pipe 54 is provided in each recycle conduit 34 at the top elevation of the valve means 36 for introducing particulate sorbent material and/or particulate fuel material into the furnace 18, it being understood that other pipes can be associated with the furnace 18 and the recycle conduits 34 for distributing particulate sorbent material and/or particulate fuel material into the furnace 18 as needed. Also, two air inlet pipes 56 can be provided for introducing fluidizing air into the recycle conduits 34, respectively, for reasons that will be described.

Overfire air, from inlet pipes 58, can be introduced into the furnace 18 at any elevation above the grid plate 52. A drain pipe 60 is arranged for discharging spent fuel and sorbent material from the furnace 18 to external equipment.

The outer casing of the furnace 18, the shell 22, the recycle conduits 34, the flue-gas plenum 40 and the heat recovery area 20 are protected with a suitable insulating material, in a conventional manner.

In operation, a bed particulate material, including coal, is provided on the plate 52 and is fired while air is introduced into the plenum chamber 48. Additional fuel and/or sorbent material is introduced through the pipes 54 into the recycle conduits 34 and/or the interior of the furnace 18 as needed, and the coal is ignited by burners (not shown) positioned within the bed. As the combustion of the coal progresses, additional air is introduced into the plenum chamber 48 in quantities sufficient to achieve substantially complete combustion. Also overfire combustion air from the inlet pipes 58 may be introduced.

The high-pressure, high velocity, combustion-supporting air introduced through the air distribution plate 52 from the plenum chamber 48 is at a velocity which is greater than the free fall velocity of the relatively fine particles in the bed and less than the free fall velocity of the relatively coarse particles. Thus, a portion of the fine particles becomes entrained within, and are pneumatically transported by, air and the combustion gases. This mixture of entrained particles and gases rises upwardly within the furnace 18 to form a gas column containing the entrained particles which passes from the furnace 18 and discharges through the slots 30. The arcuate arms 32 function to direct the mixture substantially targentially against the inner wall of the shell 22. This creates centrifugal forces which promote the separation of the particles from the gases. A great majority of the particles then impinge against the inner wall of the shell 22 which reduces their velocity so that they are further separated from the gases. The separated particle slide down the recycle conduits 34 by gravity into the valve 36. The separated gates pass upwardly into the flue-gas plenum 40, and pass through the openings 56 and into the heat recovery section 20.

The separated particles build up in the valve 36 until the level exceeds the point at which the particles begin to overflow through the valve 36 and into the furnace 18 as shown by the flow arrows in FIG. 1. This permits a constant flow of the recycled particles back into the furnace 18 while sealing against back flow of the high pressure gases from the furnace 18 directly into the recycle conduits 34.

Additional particles are added through the pipes 54 in quantities sufficient to saturate the gases in the upper portion of the furnace 18 with the particles, i.e., maximum entrainment of the particles by the gas is attained. As a result of the saturation, the relatively coarse particles, along with a portion of the relatively fine particles are retained in the lower portion of the furnace 18 which thus contains a relatively high percentage volume of particles, such as up to 20% of the total volume, when operating at maximum capacity.

The remaining portion of the fine particles passes upwardly through the gas column and are separated from the gases and recycled back to the furnace 18 as described above. This, plus the introduction of additional particulate fuel material through the pipes 54 maintains the saturated gas column in the furnace 18.

Water is introduced into the steam drum 12 through the water feed pipe 14 and is conducted downwardly through downcomers or the like, into the tubes forming the walls of the furnace 18, as described above. Heat from the fluidized bed, the gas column, and the transported solids converts a portion of the water into the steam, and the mixture of water and steam rises in the tubes, and is transferred to the steam drum 12. The steam and water are separated within the steam drum 12 in a conventional manner, and the separated steam is passed from the steam drum by the steam pipes 16 first to the tubes forming the roof 38 and the walls 24 and 26 including contiguous side walls and then to the primary superheater tube banks 42C and 42D, the finishing superheater tube banks 42A and 42B, and to a steam turbine, or the like. The separated water in the steam drum is mixed with the feed water from economizer tube banks 42E and 42F inputed to the steam drum through pipe 14, and is recirculated through the flow circuitry in the manner just described. Other cooling surfaces, preferbly in the form of partition walls with essentially vertical tubes, can be utilized in the furnace 18.

The hot clean gases exiting from the space between the shell 22 and the upper portion of the furnace 18 enter the heat recovery section 20 and pass over the tube banks 42A, 42B, 42C, 42D, 42E and 42F to remove additional heat from the gases and add heat to the steam or water flowing through the latter tubes. The gases are then directed towards the outlet opening 46, exit from the heat recovery section 20, and may be directed to an airheater or the like (not shown).

In response to changes in load of the steam turbine, the temperature of the bed in the furnace 18 is maintained at a preset acceptable value by changing the amount of air supplied to the furnace 18 via the plenum chamber 48.

It is thus seen that the reactor of the present invention provides several advantages. For example, the provision of the slots 30, the arcuate arms 32, the shell 22 and the recycle conduits 34 permits the separation of the entrained particles and the recycling of same back to the furnace 18 while eliminating the need for relatively bulky and expensive cyclone separators and the ducting associated therewith. Thus, the reactor of the present invention is relatively compact and can be fabricated into modules for easy transportation and fast erection, which is especially advantageous when the reactor is used as a steam generator, as disclosed. Also, size extrapolation of this arrangement is more easily accomplished. The majority of the reaction between solids and gases, including the combustion in particular, occur below the overfire air ports, therefore minimizing carbon monoxide and hydrocarbon emissions. Also, in conjunction with the preceding advantage, staging of the air with an overfire air fraction reduces the nitrogen oxides emissions. In addition, the use of refractory material, preferably of the high conductivity type, is possible below the overfire air, where the surface face reducing gases, and in erosion-prone locations elsewhere. Further, no active control of the solids circulation rate of flow by the solids recycle system is necessary, because the continuous maintenance of the saturated gas column dictates the solids circulation. Also, by providing for extraction of relatively small amounts of the particulate solids from the fluidized bed tap, the residence time of the coarse and fine particulate solids in the system can be adjusted to suit their reacting characteristics.

Figure 3:
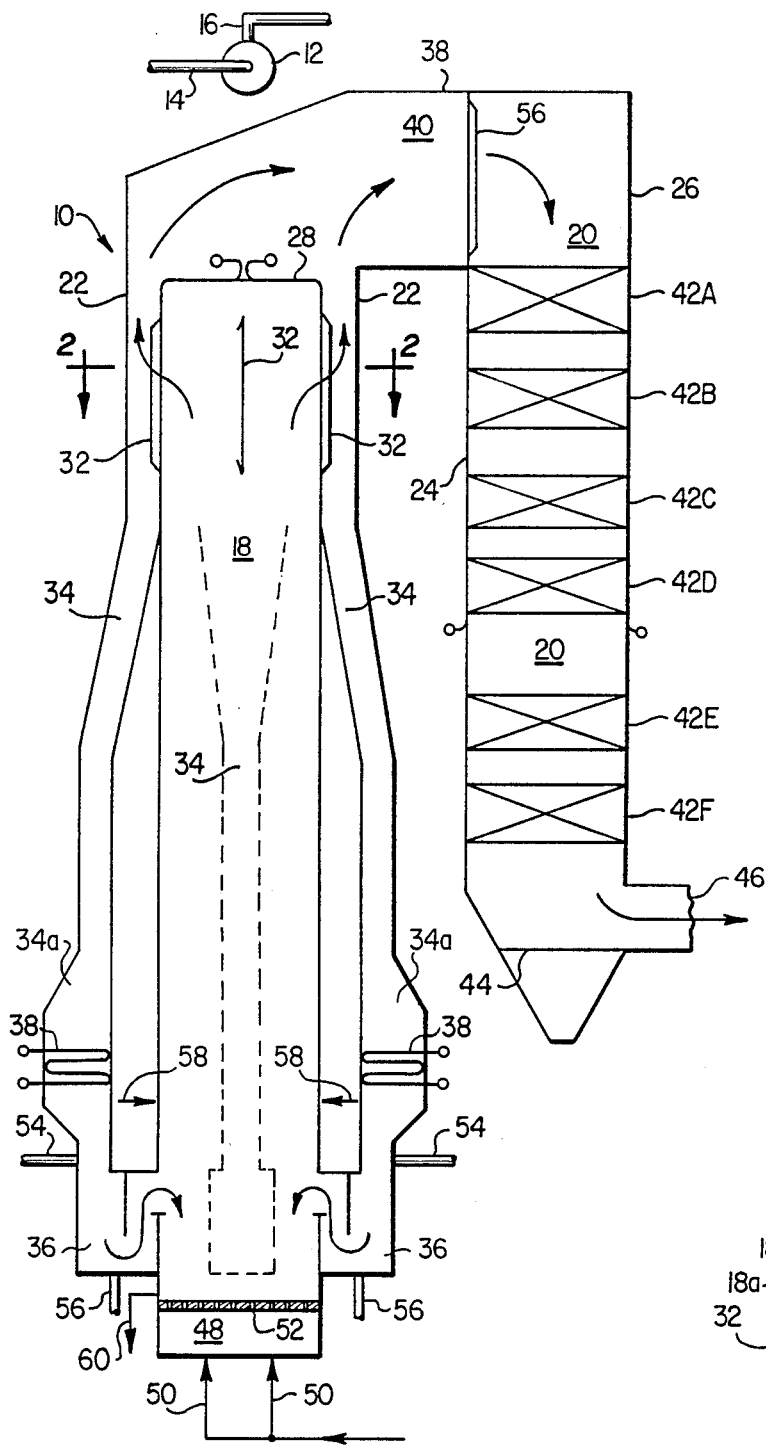
FIGS. 3 and 4 are views identical to FIGS. 1 and 2, respectively, but depicting an alternate embodiment of the present invention.
Figure 4:
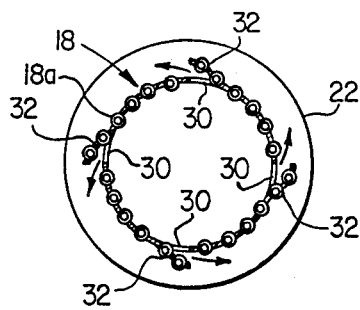

According to the embodiment of FIGS. 3 and 4, the lower portions of each conduit 34 are enlarged as shown by the reference numerals 34a and each receives a serpentine tubed heat exchanger 38 for exchanging heat from the particulate solids to the water or steam passed through the conduit. Otherwise, the structure is identical to that of the embodiment of FIGS. 1 and 2. The heat exchangers 38 can be used to provide additional superheating as necessary especially in cases where a reheater (not shown) is included in the cycle. In this case each valve 36 would have fluidizing air introduced therein by the inlet pipes 56 to maintain the required rate of particle return flow to the furnace and to maintain a level of particles so that the heat exchangers 38 are submerged in a bed of dense particles. The heat exchangers 38 would be connected into the water/steam flow circuitry described above to provide additional superheating from the heat from the beds of dense particles in the conduits 34.

Although not specifically illustrated in the drawings, it is understood that other additional and necessary equipment and structural components will be provided, and that these and all of the componets described above are arranged and supported in an appropriate fashion to form a complete and operative system.

It is also understood that variations may be made in the present invention without departing from the scope of the invention. For example, the fuel supplied to the furnace 18 can be in liquid or gaseous form rather than in the particulate solid form as described. Of course, other variations can be made by those skilled in the art without departing from the invention as defined the appended claims.

What is claimed is:

1. A reactor comprising means for forming a furnace and a heat recovery section; means in said furnace for supporting a bed of solid particulate material including fuel; means for introducing air into said bed at a velocity sufficient to fluidize same and support the combustion or gasification of said fuel and form a mixture of said air; the gaseous products of said combustion, and the particulate material entrained by said air and said gaseous products of combustion, at least one slot formed through said furnace for discharging said mixture from said furnace, baffle means surrounding said furnace in a coaxial spaced relation to said furnace, and means for directing said mixture tangentially against said baffle means to separate said particulate material from said mixture, means for directing said mixture to said heat recovery section; a plurality of recycle conduits in communication with said baffle means for receiving the separated particulate material; and means connecting said plurality of recycle conduits to said furnace for returning the separated particulate material to said bed.

2. The reactor of claim 1 wherein said plurality of recycle conduits are symmetrically located along the perimeter of said baffle means.

3. The reactor of claim 2 wherein said reactor comprises four recycle conduits.

4. The reactor of claim 1 wherein the lower portion of said baffle means is tapered to form said plurality of recycle conduits.

5. The reactor of claim 1 wherein said baffle means is disposed in an axial relationship to said furnace.

6. The reactor of claim 5 wherein said baffle means is formed by a shell extending around the upper portion of said furnace.

7. The reactor of claim 1 wherein said mixture discharges from the upper portion of said baffles means.

8. The reactor of claim 1 wherein said separated particulate material falls downwardly through said plurality of recycle conduits by gravitational forces.

9. The reactor of claim 1 further comprising means for adding additional particulate material to said bed in quantities sufficient to maintain the entrainable particulate material in said bed and in said mixture and to saturate said mixture with said particulate material.

10. The reactor of claim 9 wherein said adding means adds additional particulate material to said bed in quantities sufficient to maintain relatively coarse particles and relatively fine particles in said bed, and relatively fine particles in said column.

11. The reactor of claim 1 wherein said connecting means comprises a valve for receiving said separated particulate material, whereby said separated particulate material builds up in said valve and overflows into said furnace section to seal against backflow of air and gases from said furnace section to said plurality of recycle conduits.

12. The reactor of claims 1 or 11 further comprising flow circuit means for circulating fluid in a heat exchange relation to said furnace section and said heat recovery section to add heat to said fluid.

13. The reactor of claim 12 further comprising heat exchange means disposed in said recycle conduits and connected in said flow circuit means for adding additional heat to said fluid.

* * * * *